United States Patent [19]

Baumbach et al.

[11] 4,159,500

[45] Jun. 26, 1979

[54] MODULAR LINE PROTECTOR

[75] Inventors: Bertram W. Baumbach, Arlington Heights; John Saul, Westchester, both of Ill.

[73] Assignee: Reliable Electric Company, Franklin Park, Ill.

[21] Appl. No.: 852,325

[22] Filed: Nov. 17, 1977

[51] Int. Cl.² .................................................. H02H 3/22

[52] U.S. Cl. ........................................ 361/119; 179/98; 337/32; 337/34; 339/198 R; 361/124

[58] Field of Search ............... 361/124, 117, 118, 119, 361/120, 428, 426; 337/28, 29, 32, 33, 34; 339/111, 99 R, 198 R, 198 G, 198 GA, 198 S, 198 P; 179/91 R, 98, 99

[56] References Cited

U.S. PATENT DOCUMENTS

| | | | |
|---|---|---|---|
| 3,255,330 | 6/1966 | MacKenzie et al. | 337/32 |
| 3,535,463 | 10/1970 | Trucco | 179/98 |
| 3,825,867 | 7/1974 | Georgopulos | 337/32 |
| 3,936,785 | 2/1976 | Novak | 361/124 X |
| 3,942,077 | 3/1976 | Powers | 179/98 X |
| 3,975,664 | 8/1976 | Baumbach | 361/124 |
| 4,071,876 | 1/1978 | Benson et al. | 361/119 |

*Primary Examiner*—Patrick R. Salce

*Attorney, Agent, or Firm*—Trexler, Wolters, Bushnell & Foss

[57] ABSTRACT

An elongated line protector has a series of base modules for plug-in reception of a series of arrester modules, carbon or gas tube type as may be selected. Along opposed sides of the base modules are recesses for slide-on attachment of terminal modules each having a row of terminals, such as binding posts, connector clips, etc. for connections to telephone lines to be protected. Several groups of terminal modules may be assembled with each other side-by-side on each of the opposed base module sides depending upon the number of groups and styles of terminals desired. Correct electrical connections between the terminals and the arresters are established through the protector upon assembly by conductors including ground and line busses.

11 Claims, 9 Drawing Figures

MODULAR LINE PROTECTOR

BACKGROUND OF THE INVENTION

This invention relates to a line protector for a communications circuit. Such protectors are generally located between outside communications lines and inside equipment, for example, between telephone lines and inside telephone related equipment. Such line protectors generally protect the inside equipment from fault conditions on the outside line, such as overvoltage or overcurrent conditions which may result from lightning, electrical power surges and the like.

Line protectors of the type described are generally classified either as station protectors or as central office protectors. Central office type protectors are generally interposed between central office switching equipment and inside switching-related equipment, and comprise plug-in type modules adapted to be mounted on a common frame having receptacles for receiving a plurality of like protector units to accommodate a plurality of communications lines. Such central office type protectors are shown, for example, in U.S. Pat. Nos. 3,587,021; 3,743,888; 3,794,947; 3,818,271; 3,849,750; 3,886,408 and 3,975,664. Station type protectors generally include a dielectric block having a threaded receptacle for receiving a complementary threaded housing or cap containing a surge arrester. Such a station protector is shown for example, in U.S. Pat. No. 4,013,927. Station protectors are generally interposed between outside telephone lines and inside telephone receivers.

A protector according to this invention, as will be more fully described hereinbelow, is suitable for use as either a central office type protector or as a station type protector. However, the following discussion will be facilitated by specific reference to the protector of this invention embodied as a station type protector.

Station protectors in the prior art have generally been made with a housing, as described above, and related components, specifically designed to cooperate with specific types of arresters. Specifically, a carbon air gap arrester and a two-element gas tube arrester have heretofore been interchangeably accommodated by a given protector design, while a three-element gas tube arrester has heretofore been accommodated by another protector design. Thus, at least two different overall station protector configurations have heretofore been required to accomodate these three types of arresters. Furthermore, existing station protectors include hardware terminations for receiving lines to be protected which are molded in place, and thus capable of receiving only a limited number of lines. Thus, a different protector is required, for example when converting from single pair to multiple pair station protection. Similarly, a plurality of such station protectors may be required in the case where it is desired to protect a plurality of parallel lines, such as required when a plurality of telephone extension receivers are to be protected, thus increasing the cost of such an installation substantially. Such molded in place design therefore requires that different station protectors be fabricated for different applications, which generally leads to increased problems and costs in the fabrication thereof.

OBJECTS AND SUMMARY OF THE INVENTION

Accordingly, it is a general object of this invention to provide a modular line protector which is readily adaptable for use with carbon air gap, two element gas tube, or three element gas tube type arresters, and further for use in either single pair or multiple pair protection.

A more specific object of this invention is to provide a line protector of the type described, adapted to present as many hardware terminations as needed for accommodating the number of parallel line terminations desired in a particular application.

Another object of this invention is to provide a line protector of the type described so arranged as to present substantially unobstructed working space for terminating wires of the like to the terminals thereof.

Yet another object of this invention is to provide a line protector of the type described which is of relatively small size whereby a plurality of like line protectors may be mounted in close proximity for accommodating a plurality of lines to be protected.

Yet another object of this invention is to provide a line protector of the type described which is relatively simple and economical to assemble and yet rugged and reliable in operation.

Briefly, a modular line protector according to this invention comprises a base module including means for removably connecting said base module with an external ground buss to form an electrical and mechanical connection therewith. An arrester module includes holding means for receiving at least one overvoltage arrester, and cooperating connecting means are provided in said base module and said arrester module for removably engaging said arrester module with said base module and to provide conductive contact therebetween, including conductive contact between one side of said overvoltage arrester and said external ground buss. At least one terminal module is provided including conductive connector means for electrical connection with a line to be protected, and cooperating means are provided on said base module and said terminal module for engaging said terminal module with said base module and for maintaining conductive contact between said connector means and an opposite side of said overvoltage arrester, whereby said arrester is electrically connected between said line to be protected and said external ground buss.

Other objects, advantages and features of this invention will be more readily appreciated upon consideration of the following detailed description, together with the accompanying drawings, wherein like reference numerals are used throughout to designate like elements and components.

DETAILED DESCRIPTION OF THE ILLUSTRATED EMBODIMENTS

Figure 1:
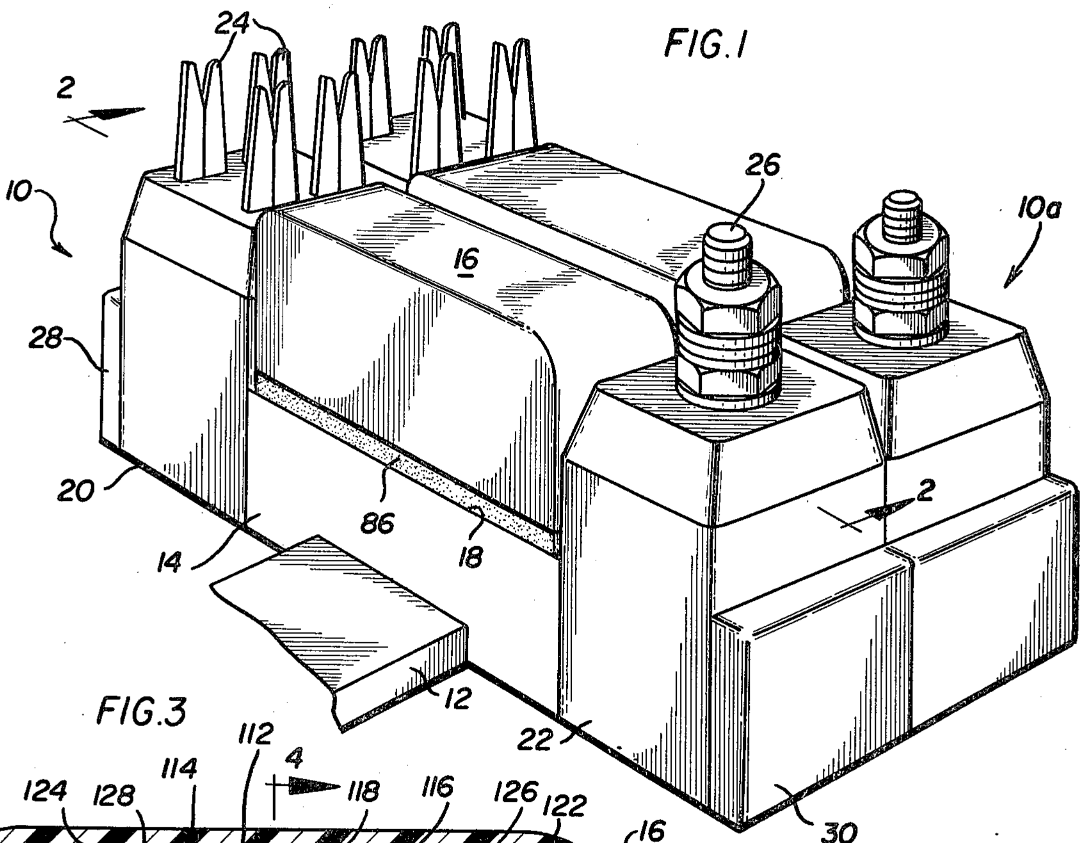
FIG. 1 is a perspective view of two line protectors according to this invention mounted in conjunction with an external ground buss.

Referring initially to FIG. 1, a line protector 10 constructed in accordance with the principals of this invention is illustrated together with a second, like line protector 10*a* both mounted on an external ground buss 12. Briefly, the line protector 10 comprises a modular protector including a base module 14 adapted to be mounted on the buss 12 to make mechanical and electrical connection therewith. An arrester module 16 is mounted at a surface 18 of the base module 14 which, it will be noted, defines a generally rectilinear solid. A pair of terminal modules 20, 22 are mounted at apposite surfaces of the base module 14, which surfaces are generally perpendicular with the surface 18 thereof. The terminal module 20 includes a plurality of clip type terminals 24, while the terminal module 22 includes a screw or post type terminal 26, in the embodiment illustrated in FIG. 1. The clip type terminals 24 may be, for example, of the general types shown in U.S. Pat. Nos. 3,636,500 to Sedlacek, 3,234,498 to Logan, or 3,112,147 to Pferd. It will be understood, however, that either type of terminal module may be interchangeably associated with either end of the base module 14. A pair of end caps or cover members 28, 30 are provided at the sides of the terminal modules 20 and 22 opposite the base module 14. As will be more fully described hereinbelow, the end caps or cover members 28, 30 may be removed for mounting additional terminal modules, substantially identical to the modules 20 and 22, at the outer ends of the modules 20, 22 to accommodate any desired number of wire terminations.

In one configuration in which the line protector according to this invention may be embodied, it is contemplated that an elongate, box-like enclosure (not shown) may be provided, for accommodating a plurality of like line protectors. It is further contemplated that the buss 12 be suitably secured to an interior wall of the enclosure, and running the entire length thereof, to accommodate a plurality of like station protectors, in substantially side-by-side arrangement, as illustrated for the protectors 10 and 10*a* of FIG. 1. In this arrangement, then, a suitable external ground connection or terminal to the buss 12 is provided, as well as suitable cabling for delivering the lines to be protected, to the respective terminal clips and/or screws of the line protectors therein.

Figure 2:
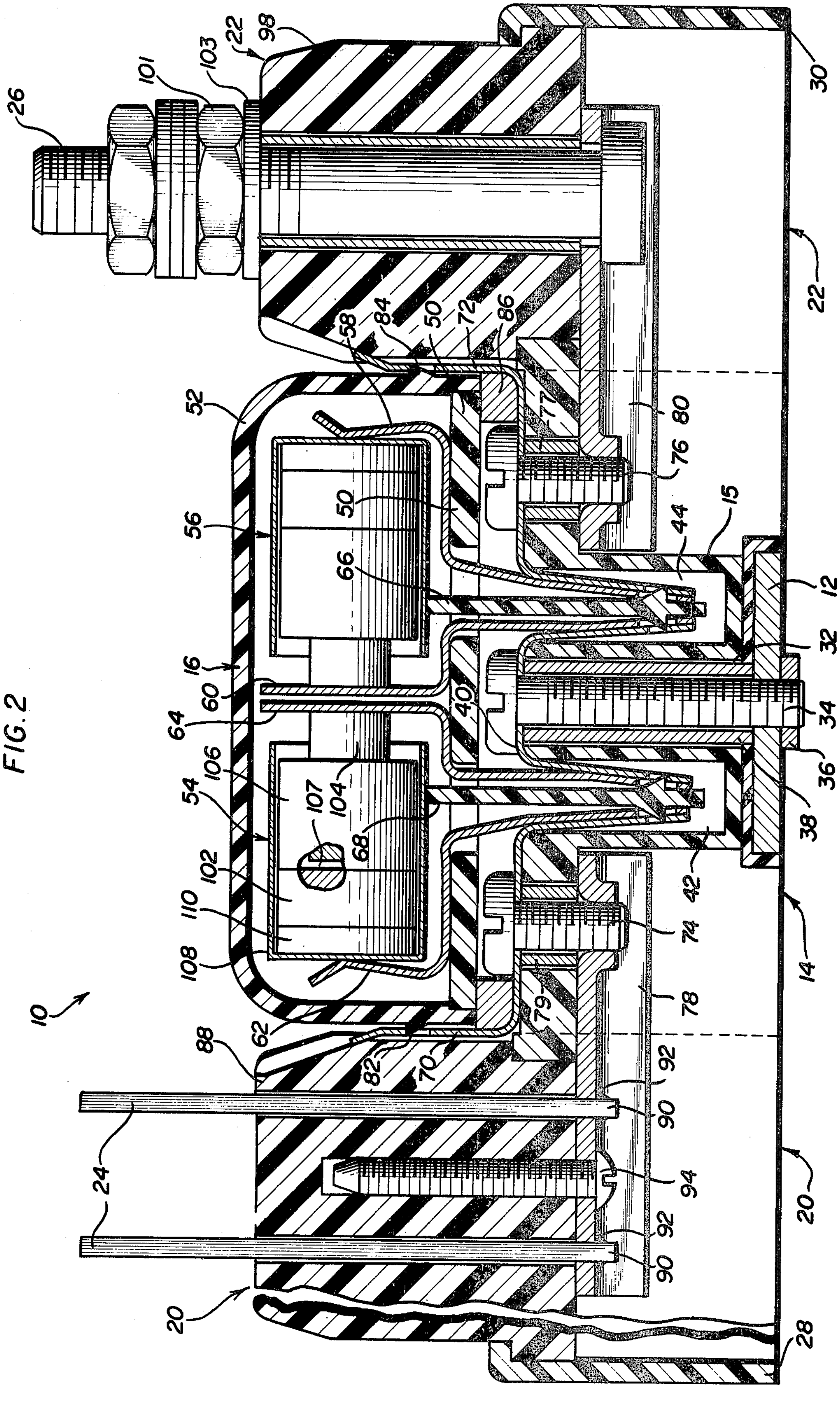
FIG. 2 is an enlarged sectional view, taken generally in the plane of the line 2—2 of FIG. 1.
Figures 6, 7, 8, 9:
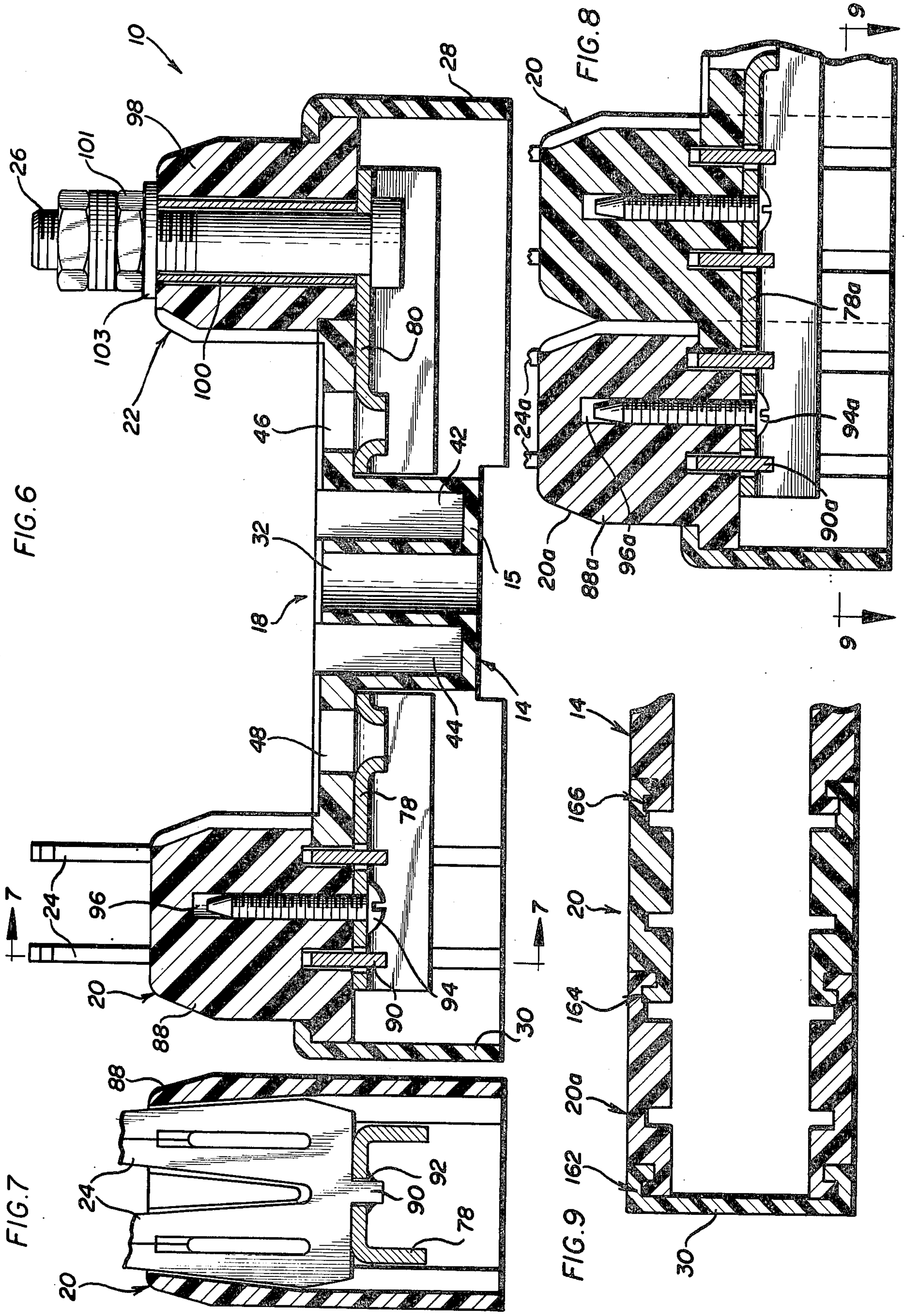
FIG. 6 is a sectional view of a portion of the line protector of FIG. 2, illustrating additional detail thereof.
FIG. 7 is a sectional view, taken generally in the plane of line 7—7 of FIG. 6.
FIG. 8 is a sectional view, illustrating an alternate configuration of a portion of FIG. 6, in accordance with one feature of this invention.
FIG. 9 is a sectional view taken generally in the plane of line 9—9 of FIG. 8.

Reference is now made to FIG. 2, wherein the protector 10 of FIG. 1 is shown in section, taken generally in the plane of the line 2—2 thereof. With reference also to FIG. 6, in which the protector 10 is shown partially disassembled, it will be seen that the base module 14 includes a dielectric plastic body 15, having formed therein, generally cylindrical aperture 32 extending substantially centrally therethrough for accommodating a fastener such as a screw 34 which is joined to the buss 12 by suitable means such as a nut 36. Advantageously, a tubular metal washer or sleeve 38 surrounds the body of the screw 34, and a resilient, metallic, generally U-shaped contactor or spring clip 40 is interposed between the head of the screw 34 and the tubular washer or sleeve 38. The ends of the contactor 40 extend respectively into a pair of wells 42, 44 formed in the body 15 adjacent either side of the opening 32. The screw 34, and tubular washer or sleeve 38, thus hold the contactor 40 in conductive contact with the ground buss 12, and provide mechanical connection of the base module 14 therewith. It will be appreciated that the tubular metal washer or sleeve 38 provides direct metal to metal contact between the contactor 40 and ground buss 12 such that the plastic side walls of the aperture 32 are not depended upon to maintain either the electrical or mechanical connection. A pair of generally circular apertures 46 and 48 are formed in the body 15, extending through the top surface 18 of the base module 14 to either side of the respective wells 42 and 44.

As seen in FIG. 2, the arrester module 16 includes a base portion 50 and a cover member 52 both formed of a dielectric plastic material. The cover 52 snappingly engages the outer edge of the base portion 50 to form top and side closures for the module 16. A pair of carbon air gap type arresters 54, 56 are each removably mounted in the module 16 by pairs of generally Z-shaped resilient metallic contactors or spring clips 58, 60 and 62, 64, respectively. A pair of legs 66 and 68 are formed in the base 50 and are spaced apart to extend substantially into the central portions of the respective wells 42 and 44 of the base module 14. The lower portions of the legs 66 and 68 are flared outwardly somewhat to engage complimentary apertures in the respective contactors 58, 60 and 62, 64. Suitable openings are formed in the base 50 adjacent the legs 66 and 68 for the respective contactors to extend therethrough. It will be appreciated from the foregoing description, that the configuration and placement of the contactors 58, 60 and 62, 64 is such as to hold the carbon arrester assemblies 54, 56 in compression therebetween, to define the assembled arrester module 16. A pair of resilient, generally Z-shaped metallic contactors or spring clips 70 and 72 each have one end thereof extending downwardly into the respective wells 42, 44, a middle portion thereof abutting the top surface 18 of the base module 14 adjacent the apertures 46, 48, and opposite ends thereof extending adjacent the outer sides of the cover member 52 of the arrester module 16. A pair of screws 74, 76 extend through openings formed therefor in the respective contactors 70 and 72 and through the apertures 46 and 48 therebelow to engage complimentary threaded openings provided therefor in a pair of line buss bars 78, 80. The line busses 78, 80 form a portion of the terminal module 20, 22, which will be described more fully hereinbelow.

As best seen in FIG. 2, then, the resilient contactors 70, 72 are provided with openings for engaging a pair of teeth 82, 84 formed in the sides of the cover member 52, thereby to hold the arrester module 16 firmly in engagement upon the base module 14. It will be further noted that a resilient, sponge-like gasket member 86 is provided between the bottom 50 of the arrester module 16 and the top 18 of the base module 14, to form a seal to prevent moisture entering therebetween. A pair of tubular metallic washers or sleeves 77, 79 are provided surrounding the screws 74 and 76 and function similarly to the tubular washer or sleeve 38, described above.

It will be appreciated from the foregoing, that the wells 42 and 44 and the portions of the resilient contactor 70, 72 and 40 therein effectively define a "receptacle" in the base module 14. Similarly, the downwardly extending legs 66 and 68 and the portions of the contactors 58, 60 and 62, 64 joined thereto effectively define a "plug-in" portion of the arrester module 16 to be received in the "receptacle." Advantageously, the configuration and placement of the resilient contactors 40, 70 and 72 are such that when the "plug-in" arrester module 16 is inserted in the "receptacle" base module 14 as described, electrical contact is obtained between the respective pairs of adjacent contactors 58 and 72, 62 and 70, which may be designated line contacts, and between the adjacent pairs of contactors 60 and 40, 64 and 40, which may be designated ground contacts. Similarly, when the arrester module 16 is removed from the base module 14, the resilient contactors 40, 70 and 72 tend to make contact within the wells 42, 44 to form electrically conductive contact therebetween. As will be described later, the terminals 24 and 26 for receiving the lines to be protected are in electrically conductive contact via the line busses 78, 80, with the contactors 70 and 72. Thus, in the first described situations: with the arrester module 16 inserted in the base module 14, the arresters 54, 56 are connected between the lines to be protected and ground. Conversely, when the arrester module 16 is removed from the base module 14, the lines to be protected are in conductive contact with ground.

Turning now to the terminal modules 20 and 22, the respective terminals 24 and 26 thereof are in conductive contact with the respective line busses 78 and 80 at a portion thereof somewhat outwardly of the screws 74 and 76. As best seen in FIGS. 6 and 9, the terminal module 20 including the clip type terminals 24 comprises a dielectric plastic terminal block 88 having suitable cavities formed therein for receiving the terminals 24 and the line buss 78. In a preferred embodiment, the terminals 24 comprise pairs of clip type terminals each formed with a common base and having a connecting member 90 extending downwardly through a suitable opening provided therefor in the line buss 78. The connecting members 90 of the terminal clips 24 are preferably secured to the line buss 28 by welding or soldering, as indicated by the reference numeral 92. The line buss 78 is mechanically secured to the terminal block 88 of the terminal module 20 by suitable connecting means such as a screw 94 which engages an aperture provided therefor in the line buss 78 and a complimentary internally threaded opening 96 provided therefor in the terminal block 88.

Similarly, the terminal module 22 comprises a plastic dielectric terminal block 98 having a central opening therethrough for receiving the screw-type terminal 26. The line buss 80 is provided with a suitable opening for receiving the body of the screw-type terminal 26, and a conductive tubular washer or sleeve member 100 is provided surrounding the body of the terminal 26 in the block 98. A suitable internally threaded element such as a nut 101 engages the external thread of the screw-type terminal 26 at the top of the block 98 and a conductive metallic washer 103 is interposed between the nut 101 and the sleeve 100. Thus, the screw terminal 26 and nut 102 engage the washer 103, the sleeve 100 and the line buss 80, to provide a suitable metallic conductive path between the terminal 26 and the line buss 80. In similar fashion to the sleeve 38 provided for the screw 34 of the base module 14, then, the sleeve 100 avoids any dependence on the plastic material of the block 98 to maintain good electrical and mechanical connection between the terminal 26 and line buss 80.

From the foregoing, it will be seen that the terminal modules 20, 22 are arranged to position the respective terminals 24, 26 outwardly of the base module 14, and arrester module 16, to provided ample space for connecting lines to be protected thereto.

In accordance with a feature of the invention, different types of overvoltage arresters may be included in the arrester module 16. Attention is directed to FIGS. 2 through 5 wherein three different types of voltage arresters are illustrated in conjunction with the arrester module 16. As referred to briefly above, FIG. 2 illustrates a pair of carbon air gap type arrester assemblies 54 and 56 for providing line protection to a pair of lines. The arrester assemblies 54 and 56 are identical, whereby only the arrester assembly 54 will be described in detail. The arrester assembly 54 includes a carbon air gap type arrester comprising a generally disc-shaped electrode 102, and a generally cylindrical electrode 104 mounted within an annular insulating and spacing sleeve member 106 of dielectric material such as ceramic. The sleeve 106 is arranged, in conventional fashion, to provide an air gap 107 of predetermined width between facing surfaces of the electrodes 102 and 104.

In accordance with a feature of the invention, the arrester module is adapted to make direct metallic connection between the contactors 62 and 64, that is between the line to be protected and ground, in the event of a prolonged overvoltage or overcurrent condition on the line. Accordingly, a metallic cup-shaped housing 108 has a closed end in direct conductive contact with the contactor 62, and side walls extending around the air gap arrester. The open end of the housing 108 is spaced apart from the opposite contactor 64 by substantially the width of a fusible, disc-shaped solder pellet 110 interposed between the closed end of the housing 108 and the electrode disc 102. Thus, a prolonged overvoltage or overcurrent of the type described will cause melting of the fusible pellet 110, whereby the resilient contactor 62 will urge the housing 108 into direct metallic contact with the contactor 64, thus forming a direct metallic contact between the lines to be protected and ground.

Figure 3:
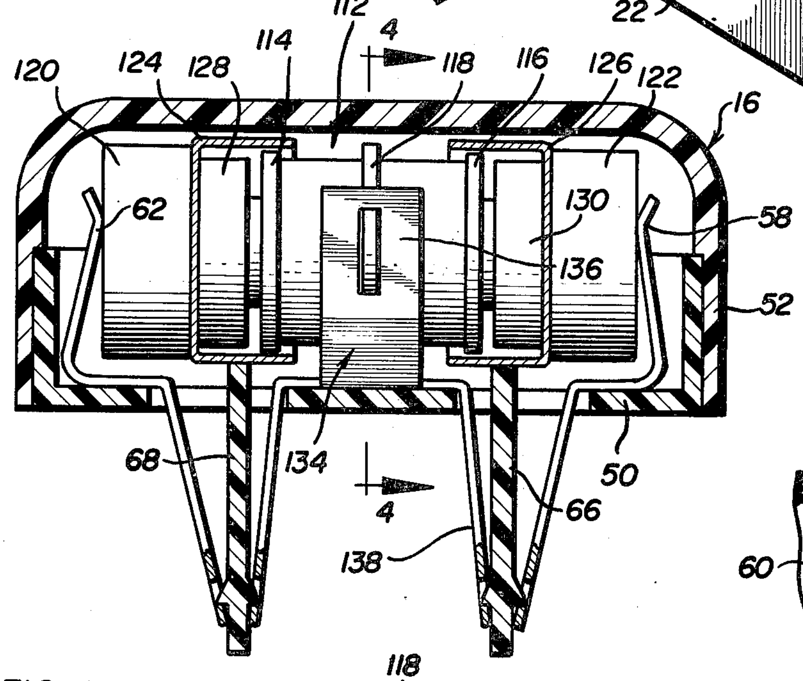
FIG. 3 is an elevational view, partially in section, of an alternate embodiment of a portion of the line protector of FIG. 2.
Figure 4:
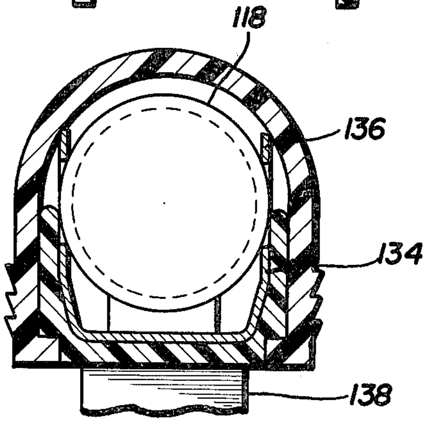
FIG. 4 is a sectional view, taken generally in the plane of the line 4—4 of FIG. 3.

Referring now specifically to FIGS. 3 and 4, a similar arrangement of the contactors 58 and 62, and a contactor 134 accommodate a three-element gas tube type arrester in the arrester module 16. The three-element gas tube arrester 112 is conventionally formed with a pair of end electrodes 114, 116 for connection to a pair of lines to be protected and a central electrode 118 for connection with ground, whereby an overvoltage at either electrode will arc over to the center electrode. The contactor 134 is provided for engagement with the center electrode 118. A pair of conductive spacer discs 120, 122 are provided interposed between the resilient contact clips 58 and 60 and the three-element gas tube 112, to maintain the contactors 58, 60 in tension. A pair of cup-shaped metallic housings 124, 126 have closed ends in contact with the spacers 120, 122, and side walls extending inwardly to surround the electrodes 114, 116. A pair of fusible solder discs or pellets 128, 130 are interposed between the closed ends of the cups 124, 126 and the respective electrodes 114, 116 of the gas tube 112. Thus, when a prolonged overvoltage or over-condition occurs on the line associated with either of the contactors 58 or 60, the associated fusible solder pellet (128 or 130) will tend to melt, whereby the associated cup-shaped housing (124 or 126) is urged by the respective resilient contactor (58 or 62) into direct metallic engagement with the center electrode 118, thus providing direct metallic contact between the line to be protected and ground. A U-shaped resilient portion 136 of the contactor 134 is arranged to snappingly engage the center electrode 118, providing both mechanical and electrical connection therewith. The contactor 134 also includes a pair of downwardly extending legs 138 which engage the legs 66, 68 in the same fashion as the lower portions of the contactors 60 and 64 of FIG. 2. Thus, the arrester module 16 of FIGS. 3 and 4 is insertable and removable with respect to the base module 14, in the same fashion as described above with reference to FIG. 2.

Figure 5:
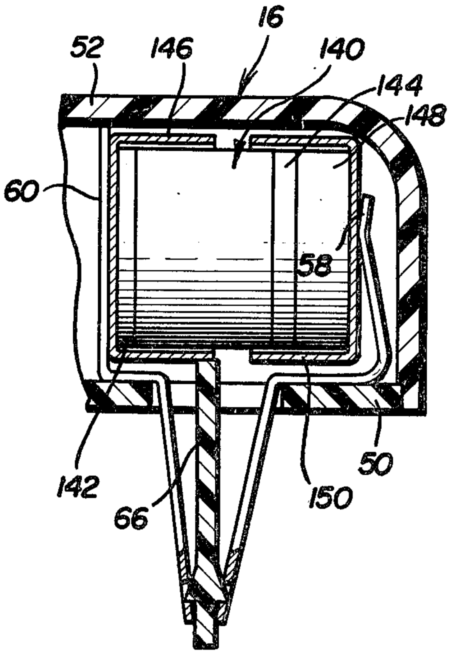
FIG. 5 is an elevational view, partially in section of yet another embodiment of a portion of the line protector of FIG. 2.

In FIG. 5, a single two element gas tube type overvoltage arrester 140 is illustrated in conjunction with the arrester module 16. It will be appreciated that, similar to the pair of arresters 54, 56 illustrated in FIG. 2, a pair of similar two-element gas tube arresters may be included in the arrester module 16, whereby only the single gas tube arrester 140 is illustrated in FIG. 5. The arrester 140 includes a pair of end electrodes 142, 144, the electrode 142 being surrounded by a cup-shaped metallic housing member 146, which is in direct metallic contact with the contactor 60. A fusible disc-shaped solder pellet 148 is interposed between a second, similar cup-shaped member 150 and the opposite electrode 144 of the gas tube 140. The cup shaped member 150 is in direct contact with the resilient contactor 58. Thus, the gas tube 140 is electrically connected between the line to be protected and ground, for discharging in conventional fashion and response to overvoltage conditions on the line. In similar fashion to the arrester assemblies of FIGS. 2 through 4, in response to a prolonged overvoltage or overcurrent on the line, the fusible solder pellet 148 tends to melt, whereby the resilient contactor 58 urges the cup-shaped metallic member 150 into contact with the similar member 146, thus forming direct metallic contact between the line and ground.

In accordance with another feature of this invention additional terminal modules, substantially identical with the terminal module 20 and 22, may be utilized to accommodate additional lines to be protected by the same protector unit. The features of the terminal modules providing for accepting such additional modules are substantially identical for either the clip-type terminal module 20 or the screw-type terminal module 22, whereby only the former is illustrated described herein. Referring to FIGS. 7 and 8, a second terminal module *20a* is illustrated connected with the terminal module 20. It will be noted that the end closure member 28 may be slidably removed from the end of the terminal module 20, being engaged thereon by a complimentary tongue and groove arrangement 162 as best seen in FIG. 9. Similar complimentary tongue and grooves arrangements 164, 166, are provided at either end of the base module 14, and at either end of the terminal module 20 and *20a*. Thus, additional terminal modules may be either added or removed relatively easily by slidably engaging and disengaging the cooperating tongues and grooves. To accommodate electrical connections with the additional terminals of the terminal module *20a*, the line buss 78 is replaced, in FIG. 7, by a similar, longer line buss *78a*. The line buss *78a* includes additional apertures therein for accommodating the terminal clips *24a* of the terminal module *20a* and the holding screw *94a* thereof. It will be appreciated with the provision of yet a longer line buss, that as many additional terminal modules may be accommodated as necessary to provide protection to any number of parallel lines, as required in a particular application.

While the present invention has been shown and described herein with reference to preferred embodiments thereof, it is not desired to limit the invention thereto. On the contrary, various changes and modifications may become apparent to those skilled in the art, and form a part of this invention insofar as they fall within the spirit and scope of the appended claims.

The invention is claimed as follows:

1. A modular line protector comprising a base module including means for removably connecting said base module with an external ground buss to form an electrical and mechanical connection therebetween, an arrester module including holding means for removably receiving at least one overvoltage arrester, cooperating connecting means in said base module and said arrester module for removably connecting said arrester module with said base module, at least one terminal module having a terminal for connection with a line to be protected, cooperating engaging means on said base module and said terminal module for removably engaging said terminal module with said base module and including means for connecting the terminal in said terminal module to a line buss to form a mechanical and electrical connection therewith, and cooperating conductive means in said base module, said arrester module and said terminal module for establishing conductive contact between said terminal and one side of said overvoltage arrester and between said external ground buss and an opposite side of said overvoltage arrester whereby said arrester is electrically connected between said line to be protected and said external ground buss.

2. A modular line protector according to claim 1 wherein said arrester module has a pair of carbon air gap type arresters, and further including a pair of said terminal modules, each of said terminal modules having a terminal in conductive contact with a line to be protected and, via said cooperating conductive means, with said one side of one of said carbon air gap arresters, said opposite side of each of said carbon air gap arresters being in conductive contact, via said cooperating conductive means, with said external ground buss.

3. A line protector according to claim 1 wherein said arrester member comprises a three electrode gas tube type arrester having a center electrode in conductive contact, via said cooperating conductive means, with said external ground buss and a pair of end electrodes and further including a pair of said terminal modules, each having connector means in conductive contact with a line to be protected and, via said cooperating conductive means, with one of said end electrodes of said three electrode gas tube type arrester.

4. A modular line protector comprising a base module including means for removably connecting said base module with an external ground buss to form an electrical and mechanical connection therebetween, an arrester module including holding means for removably receiving at least one overvoltage arrester, cooperating connecting means in said base module and said arrester module for removably connecting said arrester module with said base module, at least one terminal module having a terminal for connection with a line to be protected, cooperating engaging means on said base module and said terminal module for removably engaging said terminal module with said base module, and cooperating conductive means in said base module, said arrester module and said terminal module for establishing conductive contact between said terminal and one side of said overvoltage arrester and between said external ground buss and an opposite side of said overvoltage arrester whereby said arrester is electrically connected between said line to be protected and said external ground buss, and wherein said cooperating conductive means in said base module are arranged for making conductive contact between said terminal and said external ground buss upon removal of said arrester module from said base module.

5. A modular line protector according to claim 4 wherein said base module defines a substantially rectilinear solid, and said cooperating connecting and engaging means thereon for said arrester module and for said terminal module, respectively, are on perpendicular surfaces of said base module, said base module further being arranged to make said connection with said ground buss on a surface thereof opposite said arrester module, whereby a pair of opposite sides of said base module are unobstructed for permitting a plurality of like modular protectors to be connected with said external ground buss substantially in side-by-side alignment thereon.

6. A line protector comprising a base module including means for removably connecting said base module with an external ground buss to form an electrical and mechanical connection therebetween, an arrester module including holding means for removably receiving at least one overvoltage arrester, cooperating connecting means in said base module and said arrester module for removably connecting said arrester module with said base module, at least one terminal module having a terminal for connection with a line to be protected, cooperating engaging means on said base module and said terminal module for removably engaging said terminal module with said base module, and cooperating conductive means in said base module, said arrester module and said terminal module for establishing conductive contact between said terminal and one side of said overvoltage arrester and between said external ground buss and an opposite side of said overvoltage arrester whereby said arrester is electrically connected between said line to be protected and said external ground buss, and wherein said terminal module further includes second cooperating engaging means for removable engagement of a like terminal module thereto, and said cooperating conductive means include means for making conductive contact between said connector means of said like terminal modules, whereby a plurality of like terminal modules are selectively inter-connectable, for forming a common conductive contact between a plurality of lines to be protected and said one side of said arrester.

7. Equipment for protecting telephone lines comprising a group of bases each including a dielectric body and a conductive ground member for engaging an external ground buss, a series of arrester units one removably mounted on each base so as to form a row of bases and arrester units along the ground buss, each arrester unit including at least two electrodes forming an arc gap, conductor means by which one of the electrodes of each arrester unit is connected to said ground member of its associated base, a first group of terminal modules each having a terminal, first cooperating means on the first terminal modules and associated bases for joining the bases and first terminal modules together to form a first row of terminals associated with the row of bases and arresters and generally parallel thereto, a second group of terminal modules each having a terminal, second cooperating means on said second terminal modules and the assembled bases and first terminal modules for joining the second terminal modules to the assembled bases and first terminal modules thereby to form a second row of terminals parallel to said first row of terminals, and conductive means attached to said base and said terminal modules forming circuits to the ground members from the terminals through the respective arrester units, said conductive means including a line buss on each terminal module and connected to the terminal thereon, each of said terminal modules also including a dielectric block, said first and second cooperating means comprising separable interfitting dielectric parts so that a selected member of terminal modules may be assembled with the base module.

8. Equipment for protecting telephone lines according to claim 7 in which said interfitting dielectric parts slidably engage and in which said removably mounted arrester units form a plug and socket engagement with the associated base to establish in part electrical connections from the arresters to the ground buss.

9. In a line protector the combination comprising: an arrester module having a body, a cup on said body, at least one overvoltage arrester in said cup and having at least two electrodes, conductive contactor means in conductive contact with each of said electrodes and extending outwardly of said body, one of said contactor means being in conductive contact with said cup, a solder pellet in said cup, at least one outwardly extending dielectric member on said body for engaging at least a portion of said contactor means and electrically isolating the contactor means associated with each electrode from the contactor means associated with the other electrode to define a plug portion of said arrester module for electrically connecting one of said electrodes with a line to be protected and the other of said electrodes with ground so as to connect electrically said overvoltage arrester between said line to be protected and ground, said solder pellet being disposed such that an overcurrent condition in said arrester melts the solder pellet to cause said cup to be pushed by the conductive means contacted thereto into conductive connection with the other connector means.

10. In a line protector the combination comprising: an arrester module having a body, at least one overvoltage arrester having at least two electrodes mounted on said body, conductive contactor means in conductive contact with each of said electrodes and extending outwardly of said body, at least one outwardly extending dielectric member on said body for engaging at least a portion of said contactor means and electrically isolating the contactor means associated with each electrode from the contactor means associated with the other electrode to define a plug portion of said arrester module for electrically connecting one of said electrodes with a line to be protected and the other of said electrodes with ground so as to connect electrically said over voltage arrester between said line to be protected and ground, and wherein said arrester module includes a pair of air gap type arresters, each having a pair of electrodes, said arresters being disposed so that the electrodes are substantially on the same axis, and said contactor means comprises a pair of resilient spring-like metallic contactors associated with each of said air gap arresters, first portions of each of said contactors being mounted within said body so as to make electrical contact with one of said electrodes and to engage one of said arresters between each of said pairs of contactors, and second portions of each of said contactors extending outwardly of said body to engage a corresponding one of a pair of said outwardly extending dielectric members, thereby forming said plug portion that provides prongs that project generally perpendicular to said axis.

11. In a line protector the combination comprising: an arrester module having a body, at least one overvoltage arrester having at least two electrodes mounted on said body, conductive contactor means in conductive contact with each of said electrodes and extending outwardly of said body, at least one outwardly extending dielectric member on said body for engaging at least a portion of said contactor means and electrically isolating the contactor means associated with each electrode from the contactor means associated with the other electrode to define a plug portion of said arrester module for electrically connecting one of said electrodes with a line to be protected and the other of said electrodes with ground so as to connect electrically said overvoltage arrester between said line to be protected and ground, and wherein said arrester module includes a three element gas tube type arrester having a pair of end electrodes and a center electrode, and said contactor means comprises a pair of resilient spring-like metallic contactors arranged in said body so as to have first portions thereof engaged with respective ones of said pair of end electrodes to make electrical contact therewith and to hold said arrester therebetween, and second portions thereof extending outwardly of said body to engage said outwardly extending dielectric members, a third resilient spring-like metallic contactor arranged in said body for engaging said center electrode of said arrester so as to cooperate with said first mentioned pair of contactors to retain said arrester within said dielectrid body, said third contactor further including a second portion extending outwardly of said dielectric body, to engage respective ones of said pair of said outwardly extending dielectric members.

* * * * *